Sept. 9, 1969  TADAO AGATSUMA ETAL  3,466,129
POLARIZING MICROSCOPE FOR IDENTIFYING
PROPERTIES OF FIBER
Filed March 31, 1966
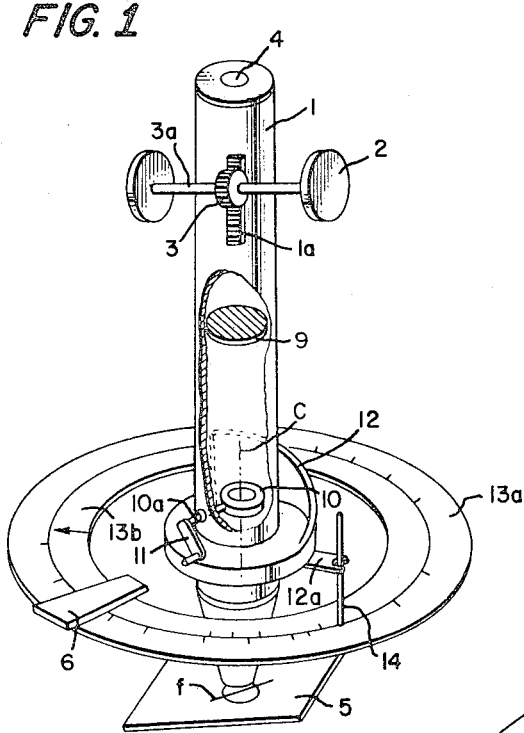
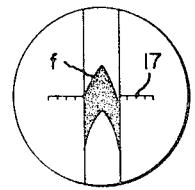
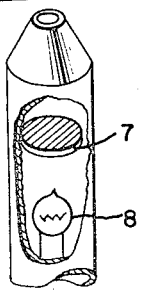
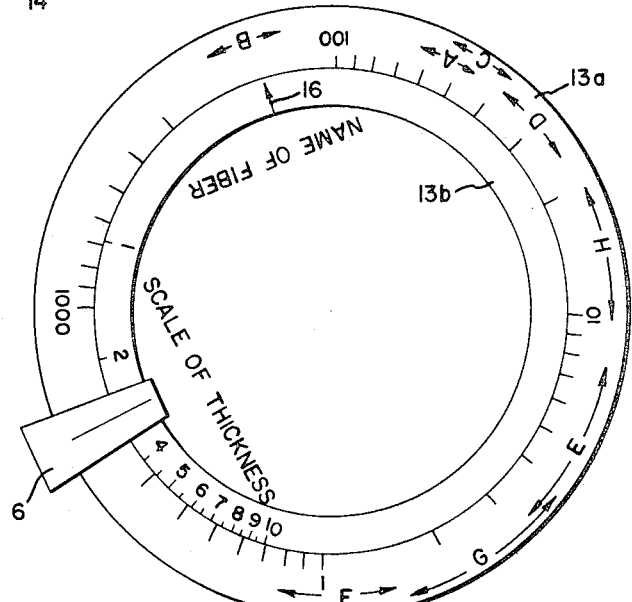
INVENTORS
TADAO AGATSUMA AND
KIYOSHI YAMANO
BY Wenderoth, Lind & Ponack
ATTORNEYS 3,466,129
POLARIZING MICROSCOPE FOR IDENTIFYING
PROPERTIES OF FIBER
Tadao Agatsuma, Yokohama, Kanagawa-ken, and Kiyoshi Yamano, Omiya, Saitama-ken, Japan, assignors to Toyo Rika Kogyo Company Limited, Tokyo, Japan
Filed Mar. 31, 1966, Ser. No. 539,043
Claims priority, application Japan, May 31, 1965, 40/43,043
Int. Cl. G01n 21/40
U.S. Cl. 356—115       4 Claims

ABSTRACT OF THE DISCLOSURE

A polarizing microscope for identifying a fiber. A source of light, a polarizer, and an analyzer for passing polarized light only at right angles to the polarized light passed by the polarizer are provided along an optical axis. A support for a fiber is positioned between said polarizer and said analyzer, and a Berek compensator is positioned between said fiber support and said analyzer. The compensator is mounted for rotation about an axis perpendicular to said optical axis, and birefringence indicating means are provided adjacent said compensator coupled to said compensator for indicating a birefringence according to the amount said compensator has rotated around said perpendicular axis, whereby the fiber can be identified by the indication of the birefringence thereof.

---

This invention relates to an apparatus for identifying a fiber and its various properties by making use of the birefringence of the fiber.

Heretofore, natural fibers have been identified by their appearance when veiwed through a general microscope or by a method involving combustion. However, with the recently developed synthetic fibers, these methods have left something to be desired. Consequently, an advanced technique, for example, analysis with chemicals etc., has been often needed. Thus users of fibers have come to realize fully the necessity of fiber-identification and have a requirement for an apparatus which is capable of finding out easily various properties of a fiber.

Generally, a particular synthetic fiber has a distortion in the molecular configuration thereof which is produced during the process of making the fiber, and therefore has a given birefringence. The same kind of fiber will always have the same birefringence, and therefore identification of the variety of a fiber can be made easily by measuring the birefringence of the fiber.

It is an object of the present invention to provide a polarizing microscope for identifying fibers by making use of this principle.

Further objects of the invention will be made clear from the following specifications, taken together with the accompanying drawings, in which:

FIG. 1 is a perspective view, partly broken away, of the apparatus according to the present invention;

FIG. 2 is a plan view of the indicator dial of the apparatus of FIG. 1; and

FIG. 3 is a representation of the view seen through the eyepiece of the apparatus.

As seen in the figures, a body tube 1 of a polarizing microscope is mounted so as to be movable up and down by a rack 1a on the cylinder 1 and a pinion 3 engaged with the rack, which pinion is rotated by a pair of knobs 2 on the pinion shaft 3a. The optical system of the microscope, which includes eyepiece 4, is focused on the fiber $f$ on the sample stage 5 which is illuminated by polarized light passing through a polarizer 7 from a light source 8. An analyzer 9 is placed so that the vibrating direction of the light passing through the analyzer is at a right angle to that passing through the polarizer 7. Without something which has birefringence, it is dark at the eyepiece of the microscope. Thereupon, when a fiber is positioned on the stage 5 at an angle of 45 degrees to the direction of vibration of light passing through the polarizer 7, the phenomenon known as retardation occurs within the fiber and generally elliptical polarization will be produced. The light thus retarded passes through the compensator 10 and produces an interference color pattern corresponding to the fiber in the eyepiece 4. Eyepiece 4 also has a thickness scale 17 therein by which the thickness of a fiber $f$ seen therein can be measured.

The compensator 10 is a Berek compensator in the form of a piece of calcite which is ground perpendicularly to the optical axis C. The compensator is positioned on the head of Z shaped lever 11, the free end of which bears against a cylindrical cam 12 and is held in contact with the cam by means of a spring (not shown). The cylindrical cam 12 is rotatable around the body tube of the microscope. The cam 12 is connected with an outer indication dial 13a by a coupling rod 14 and can be rotated by rotating the dial. The compensator 10 rotates around the axis of shaft 10a during the up-and-down movement of the free end of the lever as it moves along the cam 12.

To establish a relationship between the retardation indication dial 13a and the position of the compensator 10, constant values depending on the thickness and retardation values at the various rotation angles of the compensator are computed by a formula, and the height of edge of the cylindrical cam 12 is adjusted according to these values so that the retardation value corresponding to the rotation angle of the compensator 10 can be brought in line with the graduation on the indication dial 13a. In other words, retardation corresponding to the angle of the compensator 10 is indicated on the retardation indication dial by fixed index 6 fixed to the microscope by means (not shown). The indication dials comprise the first or retardation indication dial 13a and a second or fiber thickness dial 13b shown in FIG. 2 and they are graduated in logarithmic scales. The dial 13b is concentric with and easily rotatable inside the dial 13a and is used for carrying out a division operation.

As stated above, after an interference color pattern corresponding to the retardation in the fiber comes into view within the eyepiece 4, when a retardation reverse to that given the light by the fiber is given to the light by compensator 10, the image of the part of the fiber visible within the eyepiece becomes dark. At that time the index 6 shows the retardation.

At this point, the relationship among thickness of fiber, retardation and birefringence is:

$$\Delta n = \Gamma / d \quad (1)$$

In the present case, $\Delta n$ is the birefringence, $\Gamma$ is the retardation and $d$ is the thickness of the fiber. However, because the indication dials are graduated in logarithms, the division in the equation given above is a subtraction. Also $$d = kn \quad (2)$$

where $n$ is the thickness graduation on the thickness scale and $k$ is a constant relating the actual thickness to a single graduation. On the basis of Equation 2, if the distance between the point of the arrow 16 and the graduation 1 on the dial 13b is defined as $k$, it is possible to divide by a figure on this graduated thickness scale. Namely, by rotating the fiber thickness dial 13b so that the graduation point thereon corresponding with the thickness of the fiber as indicated on the scale within the eyepiece 4 is brought into line with the index 6, the retardation indicated on the scale 13a is in effect divided by the thickness of the fiber indicated on scale 13b, according to Formula 1, and the birefringence of the fiber is indicated by the arrow 16.

Therefore, by placing the name of a fiber at the position of the birefringence $\Delta n$ for the fiber on the outside of scale 13a as shown in FIG. 2, it is possible to read the variety of the fiber directly.

In FIG. 2, as an example, when the thickness of the fiber is 3 on the dial 13b, as measured in the eyepiece 4 and the retardation is 2000, the arrow indicates the commercial name of the fiber to be B.

$\Delta n$ for some of the various kinds of synthetic fibers is as follows:

| Fiber | $\Delta n \times 10^3$ | Sectional form | H. COOH |
|---|---|---|---|
| (A) Polyamid (nylon) | 55–60 | Circle | Soluble. |
| (B) Polyester (Dacron) | 150–200 | do | Unsoluble. |
| (C) Polyethylene | 40–55 | do | Do. |
| (D) Polypropylene | 25–30 | do | Do. |
| (E) Poly vinyl chloride (rhovyl). | 2.5–4 | do | Do. |
| (F) Acetate | 0.4–1.5 | Non-circle | Soluble. |
| (G) Modacrylate | 2–4 | do | Unsoluble. |
| (H) Polyvinyl alcohol | 20–30 | do | Soluble. |

What is claimed is:

1. A polarizing microscope for indentifying a fiber, comprising a source of light, a polarizer, an analyzer for passing polarized light only at right angles to the polarized light passed by the polarizer, a support for a fiber between said polarizer and said analyzer, a Berek compensator between said fiber support and said analyzer, said compensator, polarizer, analyzer and support means being positioned along an optical axis, said compensator being mounted for rotation about an axis perpendicular to said optical axis, birefringence indicating means adjacent said compensator, and means coupling said compensator and said birefringence indicating means for indicating a birefringence according to the amount said compensator has rotated around said perpendicular axis and the observed thickness of the fiber, whereby the fiber can be identified by the indication of the birefringence thereof.

2. A polarizing microscope as claimed in claim 1 in which a shaft is provided perpendicular to said optical axis on which said compensator is mounted, a lever on the end of said shaft, a circular cam around said optical axis and on which said lever bears, said lever and shaft and said circular cam being rotatable relative to each other so that rotation of the cam causes the lever bearing thereon to rotate the shaft and compensator, and said birefringence indicating means comprising a first circular scale concentric to said optical axis coupled to and rotatable with said cam for indicating the amount of relative movement of said compensator.

3. A polarizing microscope as claimed in claim 2 in which said birefringence indicating means further comprises an index on said microscope, positioned so that said circular scale is movable past said fixed index, and a circular fiber thickness scale concentric to and rotatable relative to said first circular scale.

4. A polarizing microscope as claimed in claim 3 in which said scales are logrithmic scales.

References Cited

UNITED STATES PATENTS 2,431,666 11/1947 Fassin.
2,460,515 2/1949 Lowber et al.
2,516,905 8/1950 Osterberg et al.

FOREIGN PATENTS 762,190 11/1957 Great Britain.

RONALD L. WIBERT, Primary Examiner
J. ROTHENBERG, Assistant Examiner

U.S. Cl. X.R.
116—114; 350—14, 157